UNITED STATES PATENT OFFICE.

OTIS HUTCHINS AND ALFRED W. OLVER, OF NIAGARA FALLS, NEW YORK, ASSIGNORS TO THE CARBORUNDUM COMPANY, OF NIAGARA FALLS, NEW YORK, A CORPORATION OF PENNSYLVANIA.

ELECTRICAL RESISTANCE MATERIAL AND PROCESS OF MAKING.

1,322,573.      Specification of Letters Patent.     Patented Nov. 25, 1919.

No Drawing.     Application filed March 25, 1919. Serial No. 285,025.

*To all whom it may concern:*

Be it known that we, OTIS HUTCHINS and ALFRED W. OLVER, both citizens of the United States, and both residing at Niagara Falls, Niagara county, New York, have invented a new and useful Improvement in Electrical Resistance Materials and Processes of Making, of which the following is a full, clear, and exact description.

In the electrical industry there is a demand for a resistance material, usual in the form of rods of relatively high resistivity, which is capable of withstanding high frequency oscillatory discharges without suffering a permanent change in resistance. One use for such a resistance material is in connection with lightning arresters which allow the static charge on an electrical line, caused by atmosphere disturbances, to pass to ground. Another use of this material is in connection with high potential electrical lines subject to high frequency surges. The resistance material is usually placed in series with the line and has the function of cutting down or eliminating the surges.

Metallic resistances for this sort of work are not usually resorted to on account of the relatively low resistivity of such bodies. Certain types of ceramic bodies have been tried with varying success. These resistances usual consist of a conducting material, generally carbon, held together by means of a vitrified clay bond. The conductivity of such a body depends for its existence upon innumerable small contacts between the particles of carbon in the material. The internal structure of bodies of this nature has a tendency to break down when the material is subjected to high frequency oscillatory discharges, the resistance of the material increasing greatly.

We have discovered a ceramic body which has exceptional mechanical strength, can easily be maunfactured in the shapes desired by the electrical trade and which withstands high frequency oscillatory discharges of electricity without permanent change of resistance.

The present invention relates to a ceramic electrical resistance material. We have discovered such a ceramic material which has exceptional mechanical strength, can easily be manufactured into the shapes desired by the electrical trade and which withstands high frequency oscillatory discharges of electricity without permanent change of resistance.

In making such material we take a conducting material, preferably silicon carbid powder as free from carbon as it is possible to obtain it commercially, and mix it with a plastic fluxing clay relatively high in iron oxid.

A typical analysis of such a clay which has been successfully used, is as follows:

| | |
|---|---|
| $SiO_2$ | 57.90 |
| $Al_2O_3$ | 15.72 |
| $Fe_2O_3$ | 5.80 |
| $CaO$ | 6.16 |
| $MgO$ | 2.02 |
| $K_2O$ | 3.00 |
| $Na_2O$ | 1.20 |
| Ign. loss | 8.20 |

Resistances composed of these ingredients when fired in a neutral or reducing atmosphere to a temperature sufficient to fuse the bond have a very dense metallic looking structure and great mechanical strength. We control the resistance of the material by varying the percentages of silicon carbid and clay. A rod eight inches long, one inch diameter composed of 40% silicon carbid and 60% clay has a resistance of about 500,000 ohms. A rod of the same dimensions composed of 60% silicon carbid and 40% clay has a resistance of about 200 ohms. Resistances made by this method always show upon analysis free metallic iron showing that the silicon carbid has reduced some of the iron oxid contained in the bond. Certain rods have shown free iron to the extent of 1.54%. The amount of this free iron depends upon the amount of iron oxid originally present in the resistance body.

We believe that the successful operation of this resistance material is due to this reduced iron forming a metallic conducting film between the silicon carbid particles, thus producing a continuous conducting structure throughout the length of the resistance body. This structure is essentially different from that of a body depending for its conductance upon numerous contact points between carbon or other conducting material within the body.

In the preferred method of carrying out our invention we thoroughly mix fine silicon carbid powder with finely ground clay of suitable quality. The exact proportion of these ingredients depends upon the resistance of the finished article desired. This mixture is moistened with water sufficient to make it workable and then formed into the desired shapes under hydraulic pressure. The shaping of the resistance bodies can be carried out by any of the well known methods of working plastic material. In the manufacture of rods we prefer to extrude the plastic mass through a die. The shaped bodies are carefully dried and packed in coke in a suitable kiln. The temperature of the kiln is raised sufficiently to thoroughly fuse the bond of the resistances. It is necessary that the temperature be uniform and carefully controlled. The exact temperature required depends upon the amount and quality of the clay and ranges from 1250° to 1400° C. The heating is so regulated that the atmosphere within the kiln is either neutral or reducing.

In thus describing our invention, we do not limit ourselves to the use of silicon carbid powder and the above mentioned clay. We may use other clays with similar properties or, if found desirable, we may add iron oxid to the mixture of silicon carbid and clay.

We claim:

1. The process of making an electrical resistance material which consists in heating a shaped body of clay containing iron oxid and silicon carbid substantially free from carbon to a temperature sufficient to fuse the clay and to reduce at least a portion of the iron oxid; substantially as described.

2. The process of making an electrical resistance material which consists in heating a mixture of silicon carbid and a ceramic bonding material containing iron oxid to a temperature sufficient to reduce at least a portion of the iron oxid, substantially as described.

3. The process of making an electrical resistance material which consists in heating a mixture of a refractory conducting material and a ceramic bonding material containing iron oxid to such a temperature and under such conditions as to reduce at least a portion of the iron oxid; substantially as described.

4. An electrical resistance material consisting of a vitrified body composed of fused clay, silicon carbid substantially free from carbon, and metallic iron disseminated through said body; substantially as described.

5. A vitrified electrical resistance material consisting of fused clay and silicon carbid particles joined together with metallic iron reduced from an oxid in process of vitrification; substantially as described.

6. An electrical resistance material comprising a ceramic bonding material containing silicon carbid and metallic iron diffused through it; substantially as described.

7. An electrical resistance material comprising a ceramic bonding material and particles of a refractory conducting material and metallic iron diffused through the bonding material; substantially as described.

8. The process of making an electrical resistance material, which consist in heating a shaped body including among its constituents a ceramic bonding material, an iron compound, and a refractory conducting material to such a temperature and under such conditions as to convert at least a portion of the iron to the metallic form, substantially as described.

9. An electrical resistance consisting of a baked body comprising a ceramic bonding material and particles of a refractory conducting material, and metallic iron reduced *in situ* diffused through the bonding material, substantially as described.

In testimony whereof, we have hereunto set our hands.

OTIS HUTCHINS.
ALFRED W. OLVER.